Figure 1:
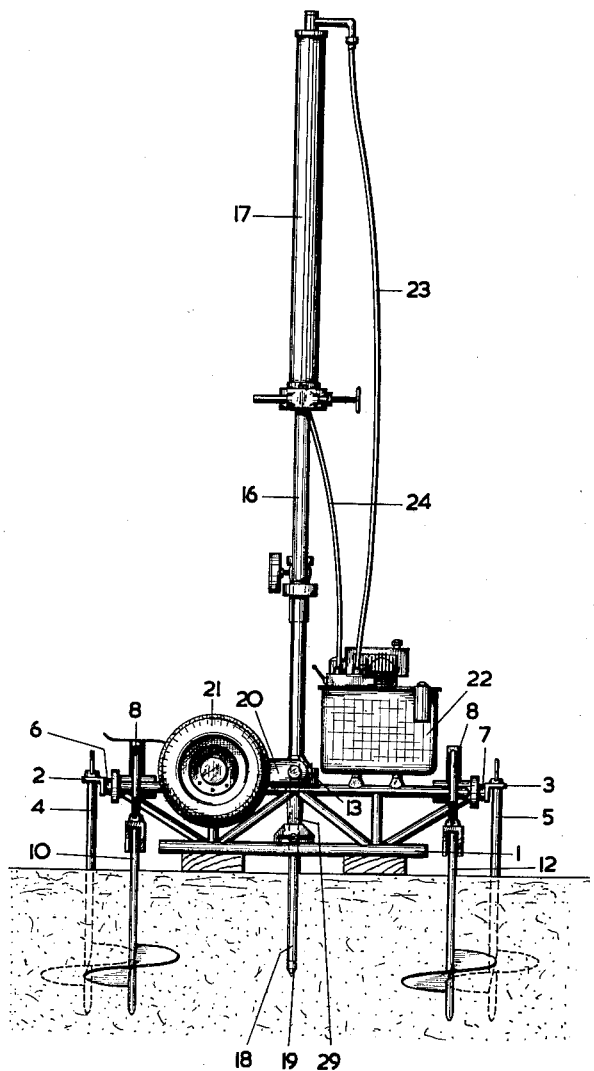

Sept. 18, 1962

P. H. ROOSEN 3,054,285

PROBING APPARATUS

Filed Sept. 21, 1959

3 Sheets-Sheet 1

INVENTOR

Petrus Hendrikus Roosen

BY Pierce, Scheffler & Parker his ATTORNEYS

Sept. 18, 1962

P. H. ROOSEN 3,054,285

PROBING APPARATUS

Filed Sept. 21, 1959

3 Sheets-Sheet 2

INVENTOR

Petrus Hendrikus Roosen,

BY Pierce, Scheffler & Parker his ATTORNEYS

Sept. 18, 1962 P. H. ROOSEN 3,054,285
PROBING APPARATUS
Filed Sept. 21, 1959 3 Sheets-Sheet 3
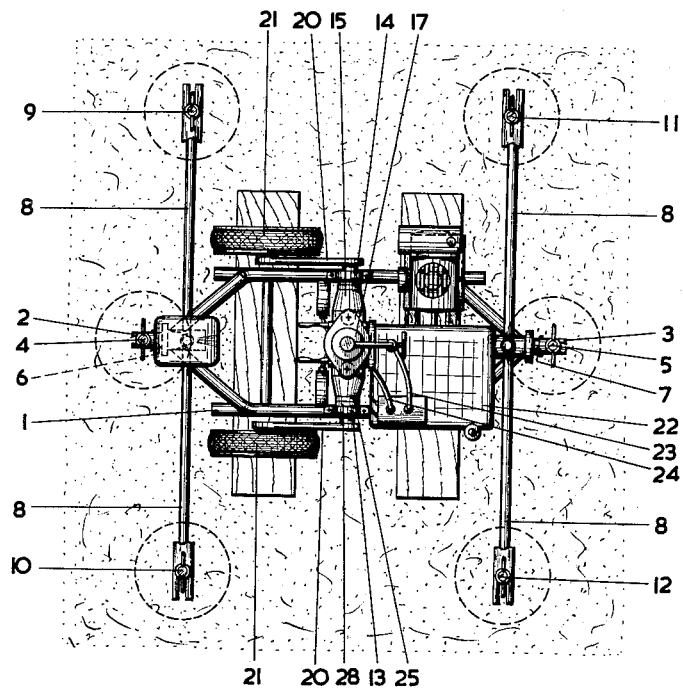
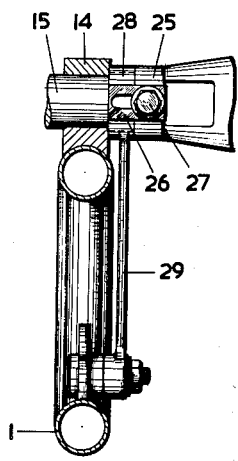
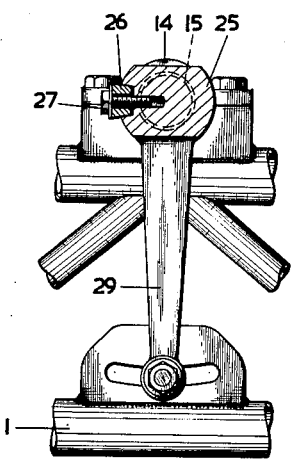
INVENTOR
Petrus Hendrikus Roosen,
BY Pierce, Schiffler & Parker
his ATTORNEYS ured Sept. 18, 1962

3,054,285
PROBING APPARATUS
Petrus Hendrikus Roosen, Gouda, Netherlands, assignor to N.V. Goudsche Machinefabriek, Gouda, Netherlands, a corporation of the Netherlands
Filed Sept. 21, 1959, Ser. No. 841,221
Claims priority, application Netherlands Sept. 26, 1958
4 Claims. (Cl. 73—84)

The invention relates to a probing apparatus consisting of a frame with connecting members for soil anchors, a vertical guiding column for the members by means of which the probing members are forced down and pulled back respectively, and a driving mechanism for the latter. In particular when an examination of the soil has to take place at an appreciable depth, such probing apparatuses are of relatively heavy construction and further have to be carefully anchored to the soil in order that they may be capable of resisting lateral displacement occurring during the probing operation. It is known to mount such a probing apparatus on a vehicle specially designed for this purpose, said vehicle being drawn by a tractor and being jacked up on the spot where the examination is to take place, in order to raise the wheels from the ground, which is necessary in order to eliminate the influence of the undercarriage, particularly the springs. In addition to these jacks for raising the vehicle, the soil anchors are required, by means of which the vehicle is anchored firmly to the ground, and owing to all this such a probing apparatus is a heavy structure, for the displacement of which a tractor is always required. But even for smaller apparatuses the transport from one probing spot to the other is a fairly difficult job, since all probing apparatuses have a column rising a good deal above the rest of the unit, which column causes the apparatus to be top-heavy when displaced by hand, owing to which the job of carrying the apparatus becomes difficult and is not without danger.

The invention has for its object to furnish a probing apparatus which is suitable for operations at great depths and high pressures and which can yet be easily transported. According to the invention this object is achieved by the fact that the guiding column at its foot is fastened pivotally to the frame in such a way that the column can be folded into the horizontal position, said column being coupled with a set of wheels which raise the frame from the ground in the folded position of the column. In the operative position therefore the probing apparatus stands in the normal way with its frame on the ground and is anchored via soil anchors. When the apparatus has to be displaced, the column is folded, as a result of which the apparatus is no longer top-heavy. Simultaneously with the folding of the column the wheels are brought from a position of rest into a position in which they raise the frame from the ground, in consequence of which a low unit has been obtained, which can easily be transported by hand via the wheels.

In some cases it may be necessary to transport the apparatus in parts, e.g. in small boats, and in order to make this possible, according to the invention the wheels are fastened to arms on a shaft which is detachably supported in its entirety in the frame, on which shaft the column is mounted. Column, shaft, and wheels thus form a unit which can be removed, while the transportability of the column is maintained. The frame which is thus left also occupies relatively little space in this way. In a probing apparatus in which the means for the displacement of the probing members are formed by a hydraulic cylinder the driving mechanism may be a pump which is driven by an internal combustion engine, the pump and the internal combustion engine together forming according to the invention a detachable unit. In this way the transportability is simplified even further, while even during the probing operations this unit may be placed at some distance and connected by means of hoses, in consequence of which the work can be performed more conveniently.

In the raised or operative position as well as in the folded position the column is locked. In this respect the construction may be such that in the operative position an adjustment of the column relative to the frame is possible, in order to ensure that the column is truly vertical.

The invention will now be elucidated more fully with reference to the drawing, which illustrates the probing apparatus according to the invention in a diagrammatic way.

Figure 2:
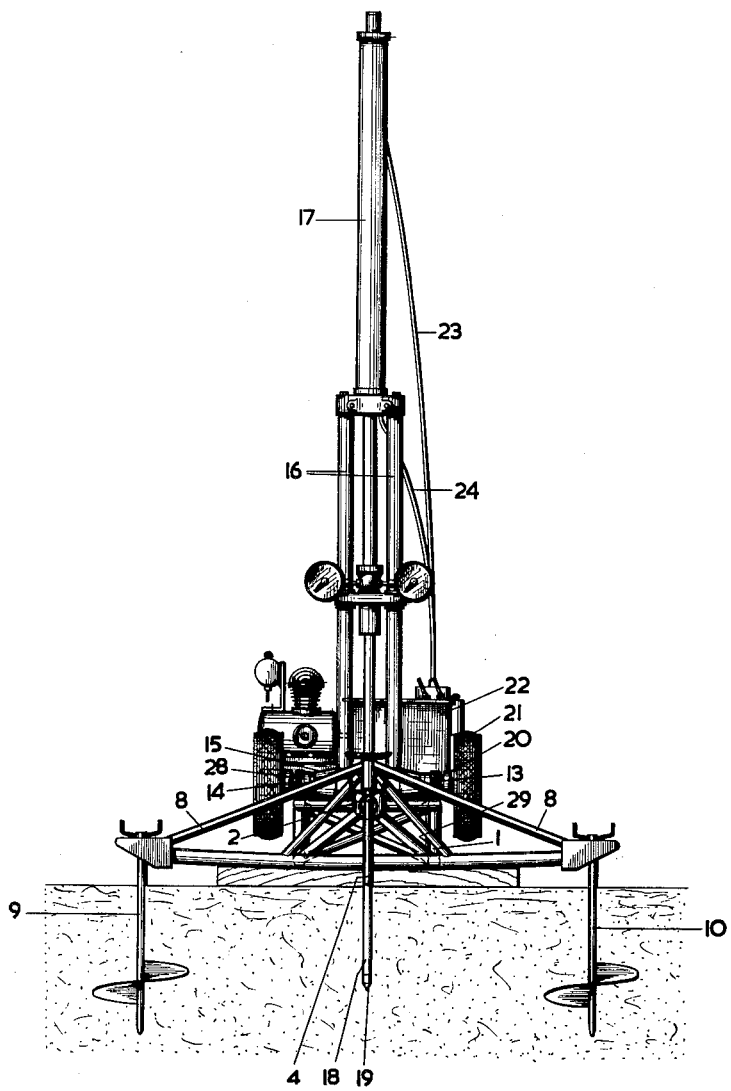

FIGURE 1 is a side elevation,
FIGURE 2 is a front elevation,
FIGURE 3 is a plan view of the apparatus,
FIGURE 4 is a vertical cross-section through a side portion of the frame, showing the locking means, and
FIGURE 5 is a side view of FIG. 4, showing the adjusting means.

The probing apparatus shown in the drawing consists of a frame 1, which narrows at the front and the rear end, as shown in FIG. 3, and is there provided with portions or projections 2 and 3 respectively, upon which the soil anchors 4 and 5 are secured. The frame, the whole of which is rigid in bending, is further provided near these ends on the upper side with supports 6 and 7 respectively for detachable straps 8, the ends of which can also be engaged by soil anchors 9, 10, 11 and 12.

In the middle of the frame 1 have been fastened bearings 13 and 14 respectively for supporting a shaft 15, in the middle of which is mounted a pair of guiding columns 16, between which the hydraulic cylinder 17 is placed, which is used for forcing into the soil the rods and tubes 18 at the lower end of which is to be found the cone 19 for the determination of the resistance.

Mounted on the ends of the shaft 15 extending beyond the bearings 13 and 14 are arms 20, which are provided with wheels 21. These arms are connected with the shaft under an angle with the column, as a result of which in the raised position of the column the wheels 21 are kept out of contact with the ground, so that the frame 1 rests completely on the ground.

In FIGS. 1 and 2 the hydraulic cylinder 17 is shown in the upwardly shifted position, but if lowered between the columns 16 the column may be swung to the left in FIGURE 1, and then the wheels will come into contact with the ground and raise the frame from the ground. In this way a readily transportable unit is formed.

The frame further carries a unit 22 consisting of an engine and a pump, which unit is connected via hoses 23, 24 with the hydraulic cylinder 17 and is also detachably fastened on the frame.

The bearings 13 and 14 of the shaft 15 may be constructed in such a way—consisting of two halves, for instance—that the shaft with wheels and column can be removed from the frame as a whole.

Fixed to the shaft 15 is a sleeve 25, carrying a slide key 26, which may be secured in place by means of the screw 27. This slide key extends into a slot of a sleeve 28 surrounding the shaft 15 and secured to the frame by means of the lever 29. As appears from FIGURE 5 this lever is secured to the frame in such a way that an adjustment can be performed. If the slide key 26 is shifted to the right and accordingly leaves the slot in the sleeve 28, the sleeve 25 and accordingly the shaft 15 can be rotated with respect to the sleeve 28. Locking of the two sleeves with respect to each other takes place by shifting the slide key 26 to the left. Locking takes place in the upwardly extending position of the column and in the folded position. If the column does not correctly extend vertically, this can be amended by adjusting the lever 29.

It will be obvious that in this way a simple, compact construction has been obtained, which is appreciably less expensive than a probing apparatus mounted on a separate vehicle and which moreover is more easily transported. If in special cases, such as transport in small boats, this apparatus is still too bulky, it can be divided into separate parts, viz. the frame 1, the unit 22 consisting of engine and pump, the columns 16, 17, with shaft 15 and wheels 21 and the bridging straps 8.

What I claim is:

1. A probing apparatus which comprises, in combination, a generally horizontal frame; spaced support members fixed to said frame and extending outwardly therefrom; soil anchors secured to said support members; a generally horizontally disposed shaft extending across, and adjacent its ends journaled for rotation with respect to, said frame; a guide means mounted on said shaft intermediate its ends; a driving mechanism secured to said guide means; probe means actuated by said driving mechanism whereby said probe means is reciprocated; arms fixed to the ends of said rotatable shaft; transportation wheel members mounted on said arms, said arms being fixed to said shaft ends at such an angle with respect to said guide means that when the shaft is rotated to a position such that the guide means is generally vertical said wheel members are off of the ground and said frame is on the ground and when the shaft is rotated to a position such that the guide means is substantially horizontal said wheel members are on the ground and the rest of the apparatus is raised from contact with the ground; and locking means for locking said rotatable shaft in any one of a plurality of positions.

2. Apparatus as defined in claim 1, in which said driving mechanism includes a hydraulic cylinder secured to said guide means and generally disposed in the plane of said guide means and an engine-pump unit disposed on said frame and operatively communicating with said hydraulic cylinder, and in which said engine-pump unit is detachably secured to said frame.

3. A probing apparatus according to claim 1, characterized in that the guide means with wheels form a detachable unit relative to the frame.

4. A probing apparatus according to claim 1, characterized in that in the raised position the guide means is locked so as to be adjustable relative to the frame.

References Cited in the file of this patent

UNITED STATES PATENTS 2,774,240    Fehlmann              Dec. 18, 1956

FOREIGN PATENTS 21,535    Great Britain                1912